United States Patent [19]

Feller et al.

[11] 4,266,329
[45] May 12, 1981

[54] APPARATUS FOR POSITIONING OUT-OF-ROUND WORKPIECES PARTICULARLY PISTON RINGS

[75] Inventors: Otto Feller, Leichlingen; Alois Skrobek, Burscheid; Wilfried Schmitz, Cologne, all of Fed. Rep. of Germany

[73] Assignee: Goetze AG, Burscheid, Fed. Rep. of Germany

[21] Appl. No.: 77,090

[22] Filed: Sep. 20, 1979

[30] Foreign Application Priority Data

Sep. 20, 1978 [DE] Fed. Rep. of Germany ....... 2840863

[51] Int. Cl.³ ............................................. B23P 15/10
[52] U.S. Cl. ....................................... 29/222; 29/271; 29/281.5; 33/174 Q
[58] Field of Search ...................... 29/222, 271, 281.5; 33/174 Q, DIG. 17

[56] References Cited

U.S. PATENT DOCUMENTS

| 2,770,050 | 11/1956 | Johnson | 33/174 Q |
| 3,751,812 | 8/1973 | Meyer | 33/174 Q |

FOREIGN PATENT DOCUMENTS 204788  12/1956  Australia ........................... 33/DIG. 17

*Primary Examiner*—James L. Jones, Jr.
*Attorney, Agent, or Firm*—Spencer & Kaye

[57] ABSTRACT

Apparatus for positioning a workpiece, such as a piston ring, which has an out-of-round inner circumferential face with a radially inwardly directed portion that deviates from the out-of-round contour. The apparatus includes first and second spaced cylindrical rollers each having a diameter which is substantially less than the diameter of the workpiece. Means are provided for rotating the rollers in the same direction about their respective longitudinal axes. Braking means, which is interposed between the rollers and may be in the form of a brake shoe, has a frontal face positioned with respect to the peripheral surfaces of the rollers so that the frontal face contacts only the portion of the inner circumferential face of the workpiece which deviates from the out-of-round contour. When the frontal face of the braking means or brake shoe is in contact with the deviated portion of the workpiece, the rollers are spaced from the workpiece causing the workpiece to be braked and positioned at the portion of the circumferential face which differs from the normal out-of-round contour. At all other positions of the workpiece, it rests on the rollers with only its own weight and is not touched by the brake shoe.

13 Claims, 5 Drawing Figures

APPARATUS FOR POSITIONING OUT-OF-ROUND WORKPIECES PARTICULARLY PISTON RINGS

BACKGROUND OF THE INVENTION

The present invention relates to an apparatus for positioning out-of-round workpieces, particularly piston rings, which have an out-of-round inner circumferential face with a radially inwardly directed portion that deviates from the normal out-of-round contour.

Piston ring blanks are provided with centering devices which permit alignment of a plurality of blanks in the circumferential direction so that they may be machined together. For example, according to the book "Kolbenringe" [Piston Rings] by Carl Englisch, published by Springer Verlag, Vienna, 1958, page 285, FIG. 266, piston ring blanks provided for this purpose each have a centering notch at their inner circumference. The notches lie in the area of the abutment opening of the finished piston rings and are later removed during the machining operation. A shaft having a diameter of approximately 4 mm is rotated at a speed of about 120 revolutions per minute in contact with the rings thereby causing them to rotate, the notches holding the rings on the shaft. Using this sorting technique, a relatively long time is required to align all of the blanks.

Further, during the sorting procedure, individual rings are sometimes caught by adjacent, already stopped, rings and therefore all of the rings may not attain their final position making optical surveillance on the part of the machine operator necessary. Moreover, the notch in the ring blank has an adverse effect on the machining process, the brief, abrupt interruption of the machining process leading to resonant oscillations which produce chatter marks on the rings and considerably reduce the service life of the tool. In addition, the notch limits the cutting speed and therefore the maximum output of the machine.

German Pat. No. 745,686 discloses an arrangement for simultaneously measuring the diameter of a shaft at several points. In this apparatus, the shaft is disposed in a rigid straddle support and is scanned at various locations by a measuring sensor disposed in the angle bisector of the support to detect deviations in the shaft diameter. For this purpose, the shaft is manually rotated in the support in the circumferential direction.

Still another publication, VDI Report No. 230, for the year 1975, page 70, FIG. 16 discloses a measuring device for checking the outer diameter, conicity and linearity of the superficies and out-of-roundness of piston bolts. In this device, piston bolts are introduced automatically and then pressed by means of a pressing device against two rollers which rotate in the same direction. The individual measurements are made during several revolutions of the piston bolts following which the piston bolts are ejected.

The above-described devices are employed exclusively for measuring purposes and cannot be used, in their present form, to position out-of-round workpieces.

It is an object of the present invention to provide an improved apparatus for positioning an out-of-round workpiece wherein the above-described disadvantages are avoided.

It is another object of the invention to provide an improved apparatus wherein out-of-round workpieces without notches can be positioned at their inner circumferences.

SUMMARY OF THE INVENTION

The present invention comprises apparatus for positioning a workpiece, such as a piston ring, which has an out-of-round inner circumferential face with a radially inwardly directed portion that deviates from the out-of-round contour. The apparatus includes first and second spaced cylindrical rollers each having a diameter which is substantially less than the diameter of the workpiece, means being provided for rotating the rollers in the same direction about their respective longitudinal axes. Braking means, which is interposed between the rollers and may be in the form of a brake shoe, is provided with a frontal face positioned with respect to the peripheral surfaces of the rollers so that the frontal face contacts only that portion of the inner circumferential face of the workpiece which deviates from the out-of-round contour. When the frontal face of the braking means, or brake shoe, is in contact with the deviated portion of the workpiece, the rollers are spaced from the workpiece causing the workpiece to be braked and positioned at the portion of the circumferential face which differs from the normal out-of-round contour. At all other positions of the workpiece, it rests on the rollers with only its own weight and is not touched by the brake shoe.

With this apparatus, it is possible to position out-of-round piston rings without notches in their inner circumference at a selected point of their circumference, preferably at their point of abutment. The point of abutment is preferred because at this portion of an out-of-round piston ring, its radius approaches infinity; i.e. in this region the inner circumference is a straight line which provides an excellent point of reference. Since the notch is no longer necessary, the cutting speed during machining can be increased thereby improving the piston ring quality.

According to a further feature of the invention, the axial spacing of the rollers, or rolls, is adjustable. This is advantageous because it permits the apparatus to be used for the positioning of rings having diameters extending over a broad range of sizes. Preferably, the rollers are driven by known servo or stepping motors.

The present invention is based on the mathematical axiom that a circle is sufficiently defined by three points. The two rollers form the first two points of contact and the brake shoe constitutes the third point of contact. The rings move freely over the rollers for most of their circumference and are braked and positioned by the stationary brake shoe only in the region of their abutment. When the rings are positioned on to the brake shoe, a gap is produced between the surfaces of the rollers and the corresponding inner circumferential faces of the rings so that the rollers rotate freely after the rings have been deposited on the brake shoe.

Preferably the brake shoe comprises a cylindrical pin or a strip member.

The strip member is used only if a plurality of out-of-round piston rings are to be positioned simultaneously. The brake shoe is provided with two contact points at its frontal face facing the workpiece to prevent sliding which might occur if there was only one point of contact. The points of contact may be sharp-edged or rounded, depending on the ring diameter.

The brake shoe can be adjusted in height with respect to the circumferential faces of the rollers so that, when the axial spacing of the rollers is changed, the height of the brake shoe changes as well. That is, the brake shoe is made adjustable along a line extending perpendicular to both the longitudinal axes of the rollers and to a line joining these axes.

The brake shoe may also comprise two individual brake jaws disposed parallel to the longitudinal axes of the rollers, the center distance between the brake jaws being adjustable. According to a further feature of the invention, the brake shoe comprises two non-parallel jaws each having one end attached to a hinge with an adjustable angle α between the jaws.

The brake shoe may also be part of an electrical switching system which switches the servo or stepping motors on and off. In this embodiment, the brake shoe stops rotation of the rollers by deenergizing the motor after the workpieces have been positioned. A photoelectric control can also be used to stop the rollers by deenergizing the motor at a predetermined point on the workpiece.

DESCRIPTION OF THE PREFERRED EMBODIMENTS

Figure 1:
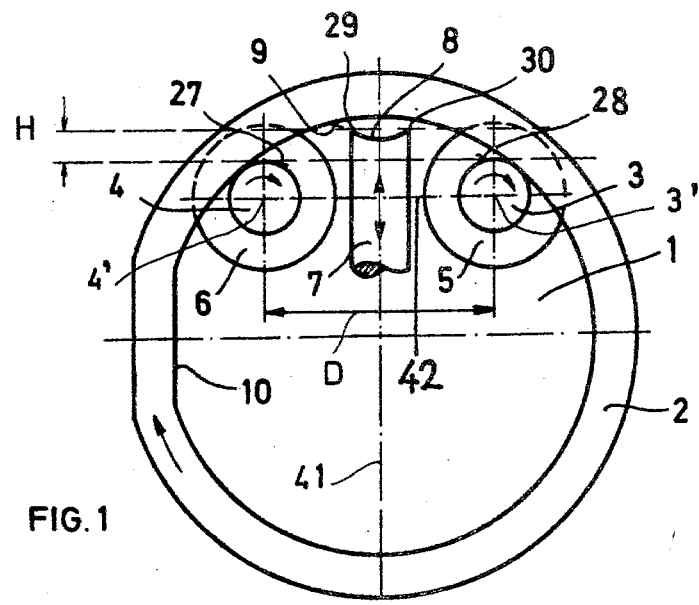
FIG. 1 shows a piston ring on the apparatus before being positioned.
Figure 2:
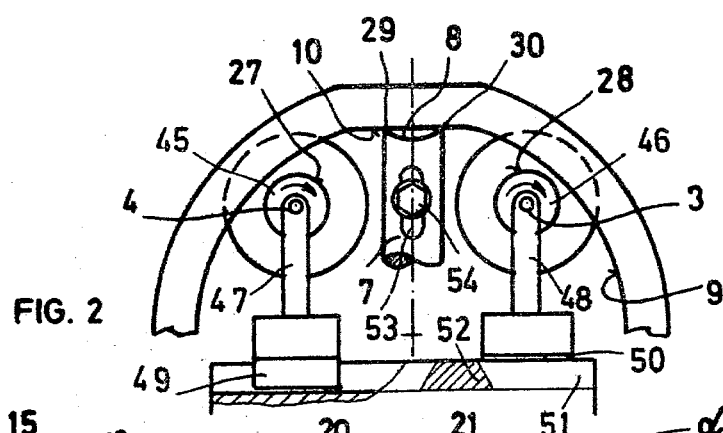
FIG. 2 shows the piston ring after being positioned.

FIGS. 1 and 2 illustrate an apparatus 1 on which a plurality of piston rings 2 can be positioned in such a way that they attain the same position with respect to each other. Although only one ring is shown in the drawing, it will be understood that several rings would normally be stacked one behind the other. The apparatus 1 comprises a pair of parallel rollers 3 and 4 driven by respective servomotors 5 and 6.

Rollers 3 and 4 are rotated by servomotors 5 and 6 about longitudinal axes 3' and 4' respectively, the axes 3' and 4' being spaced apart by a predetermined distance D. The distance D between the rollers can be adjusted in accordance with the diameters of the piston rings 2 to be positioned. The end faces 45 and 46 of rollers 3 and 4 are rotatably fastened to the ends of struts 47 and 48, respectively. The other ends of struts 47 and 48 are provided with respective flanges 49 and 50 which slide on surfaces 51 and 52 to permit adjustment of the distance between rollers 3 and 4. A brake shoe consisting of a cylindrical pin 7 is interposed between the two rollers 3, 4 and is adjustable in height with respect to the circumferential faces 27, 28 of the rollers. That is, the pin 7 is adjustable along a line 41 extending perpendicular to the axes 3' and 4' and to a line 42 joining the axes.

For adjusting the pin 7 along the line 41 the pin shows an oblong hole 53 with a screw 54 (FIG. 2).

At its face 8 contacting the inner circumferential face 9 of the piston rings 2, the cylindrical pin 7 is concave so that two sharp-edged contact points 29, 30 are formed. The piston rings 2 rest on the rollers 3, 4 with their own weight and the rollers are rotated in a clockwise direction by servomotors 5 and 6. The piston rings 2 move clockwise on the rollers 3, 4 until the rings are braked by the brake shoe in the area of the abutment 10 and position themselves on the contact points 29, 30 as shown in FIG. 2. Rollers 3, 4 continue to rotate freely without contacting the inner circumferential face 9 f the piston ring.

Typically, with a piston ring 2 having a nominal diameter of 9 cm and rollers 3, 4 having diameters of 1.2 cm, the distance D between the rollers would be 3.9 cm and the height H between lines tangential to the rollers and the contact points on pin 7 would be 0.5 cm.

Figures 3A, 3B, 3C:
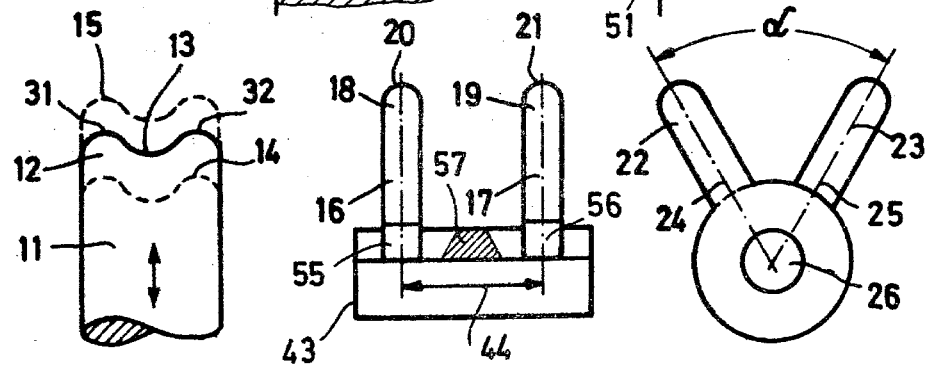
FIGS. 3a–3c show various embodiments of the brake shoe.

FIGS. 3a–3c illustrate various embodiments of the brake shoe. FIG. 3a shows a cylindrical pin 11 which has a concavity 13 at one end 12, the contact areas 31 and 32 being rounded. Pin 11 is adjustable along the axis 41 as indicted by the dashed lines 14 and 15 in the same manner as pin 7 is adjustable.

FIG. 3b shows a brake shoe comprising two brake jaws 16 and 17 attached to a supporting structure 43. Structure 43 when used as the braking device in the apparatus of FIGS. 1 and 2 is oriented with its longitudinal dimension, indicated by arrow 44, parallel to the longitudinal axes 3', 4' of the rollers 3, 4. One end 18, 19 of each of the brake jaws 16, 17 has a hemispherical shape 20, 21. Jaws 16, 17 are adjustable depending on the diameter of the ring to be positioned; i.e. their spacing with respect to one another can be reduced or increased.

In the same way as to be seen in FIG. 2 the jaws 16,17 are dovetailed 55,56 at one of their axial ends and they are guided in dovetailed bearings 57.

FIG. 3c shows a brake shoe having two jaws 22, 23 which form an angle α with one another and which have one end 24, 25 mounted on a hinge 26. The hinge 26 permits the angle α to be adjusted depending on the diameter of the ring to be positioned. Typically, with piston rings 2 having diameters of 9 cm and rollers 1.2 cm in diameter, the angle α would be between 10 and 50 degrees.

It will be understood that the above description of the present invention is susceptible to various modifications, changes and adaptations, and the same are intended to be comprehended within the meaning and range of equivalents of the appended claims.

We claim:

1. Apparatus for positioning an out-of-round workpiece in the form of a ring having an out-of-round inner circumferential face with a radially inwardly directed portion that deviates from said out-of-round contour, said apparatus comprising first and second spaced cylindrical rollers having a predetermined distance therebetween, the diameter of each of said rollers being substantially less than the diameter of said workpiece;

means for rotating said rollers about their respective longitudinal axes in the same direction; and braking means interposed between said rollers and spaced therefrom, the frontal face of said braking means facing said workpiece being positioned with respect to the peripheral surfaces of said cylindrical rollers so that said frontal face contacts only the portion of the inner circumferential face of said workpiece which deviates from said out-of-round contour, said rollers being spaced from said workpiece when the frontal face of said braking means is in contact with said workpiece and in contact with said workpiece at all other positions thereof, only the weight of said workpiece resting on said rollers.

2. Apparatus as defined by claim 1 wherein the distance between said first and second spaced rollers is adjustable.

3. Apparatus as defined by claim 1 wherein the means for rotating said rollers comprises a servomotor.

4. Apparatus as defined by claim 1 wherein the means for rotating said rollers comprises a stepping motor.

5. Apparatus as defined by claim 1 wherein said braking means comprises a cylindrical pin.

6. Apparatus as defined by claim 1 wherein said braking means comprises a strip member.

7. Apparatus as defined by claim 1 wherein said braking means is provided with two contact areas on its frontal face.

8. Apparatus as defined by claim 1 wherein the longitudinal axes of said rollers are parallel and wherein said braking means is adjustable along a line perpendicular to both the longitudinal axes of said rollers and to a line joining said axes.

9. Apparatus as defined by claim 1 wherein the longitudinal axes of said rollers are parallel and wherein said braking means comprises a pair of parallel brake jaws disposed substantially parallel to the longitudinal axes of said rollers, each of said brake jaws having a frontal face for contacting the portion of the inner circumferential face of said workpiece which deviates from said out-of-round contour.

10. Apparatus as defined by claim 9 wherein the spacing between said parallel brake jaws is adjustable.

11. Apparatus as defined by claim 1 wherein said braking means comprises a pair of non-parallel brake jaws each having a frontal face for contacting the portion of the inner circumferential face of said workpiece which deviates from said out-of-round contour.

12. Apparatus as defined by claim 11 wherein the angle between said non-parallel brake jaws is adjustable 13. Apparatus as defined by claim 1 wherein said means for rotating said rollers is controlled by said braking means.

* * * * *